Patented Nov. 11, 1952

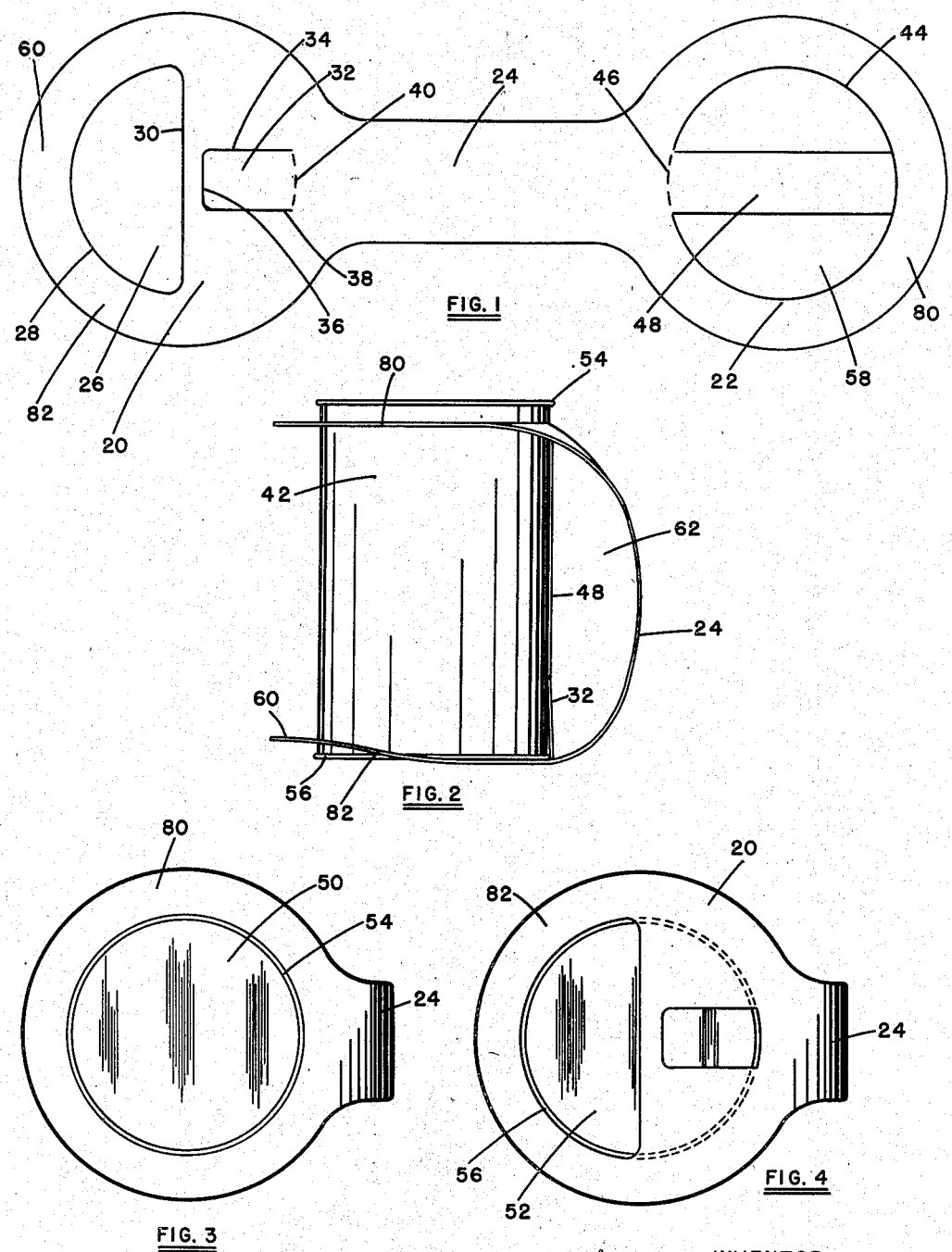

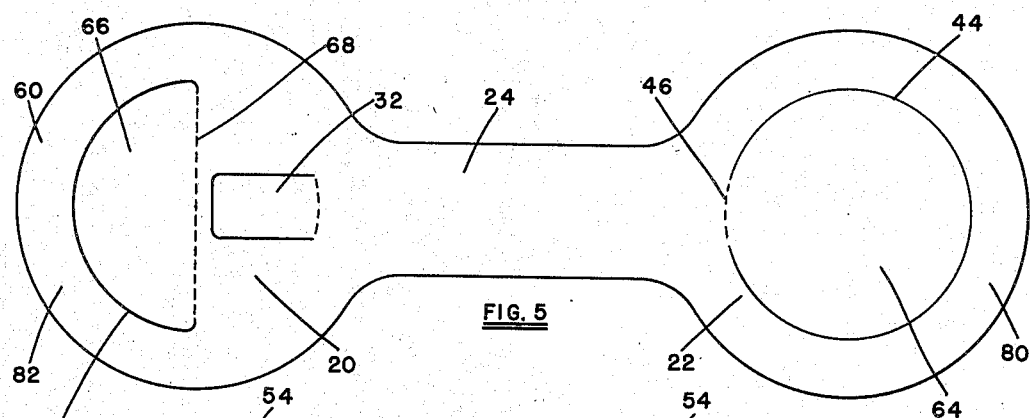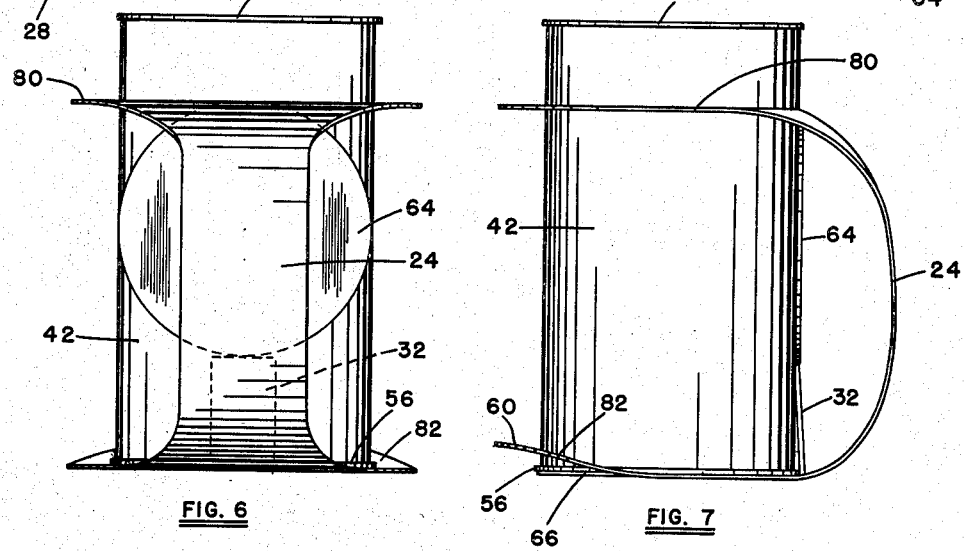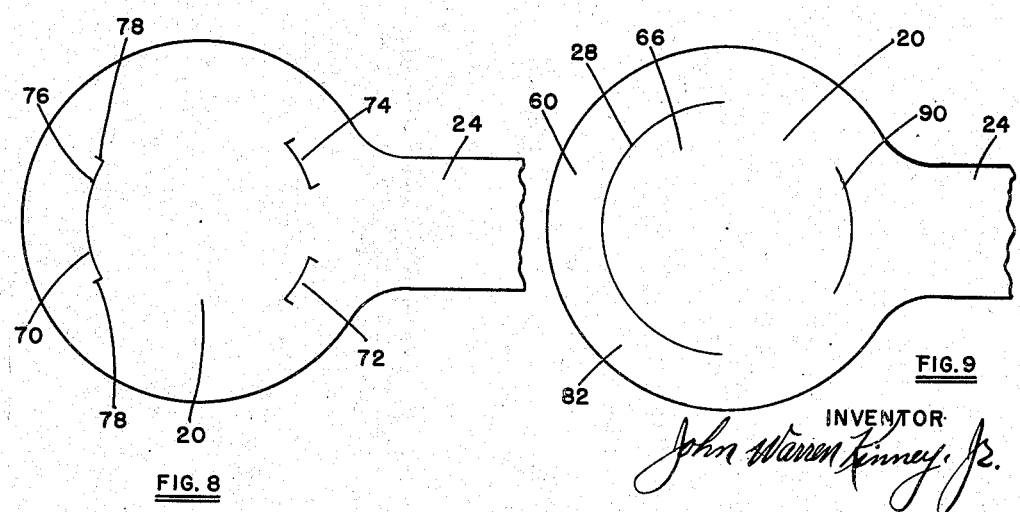

2,617,676

UNITED STATES PATENT OFFICE 2,617,676

CONTAINER HANDLE

John Warren Kinney, Jr., Cincinnati, Ohio

Application April 3, 1946, Serial No. 659,338

16 Claims. (Cl. 294—27)

This invention relates to handles, and more particularly to handles which may be readily applied to containers, such as tin cans, and the like.

An object of the invention is to provide an inexpensive handle for containers, such as tin cans, and the like, which handles may be quickly, yet securely, attached to a container, and which will serve as a handle for the container until the contents thereof have been used up.

Another object of the invention is to provide a handle for a container for the purpose of converting the container into a convenient dispensing cup or mug.

Still another object of the invention is to provide an inexpensive handle for use with containers, such as tin cans, and the like, which may be readily stamped from sheet material, such as cardboard, plastic, or even thin sheet metal.

A further object of the invention is to provide an inexpensive, easily disposable handle for a container, which handle may be provided with suitable advertising indicia for the purpose of enhancing the eye appeal of the container provided with such a handle.

Still another object of the invention is to provide a handle, having the hereinabove described characteristics, and which provides the dual function of a handle and coaster for the container to which it is applied.

Another object of the invention is to provide an inexpensive handle for a metallic container, which handle includes a shield disposed between the handle portion and the side walls of the container for defining a hand grip portion which is completely insulated from the container. This feature is particularly advantageous when the handle is applied to chilled beer cans, said shield precluding contact of the hand of the drinker of the beer with the cold container.

Still another object of the invention is to provide an inexpensive handle for containers, such as cans, or the like, which handle may be quickly, yet positively secured to the can, with which can it may be discarded after the contents of the can have been used up.

These and other objects are attained by the means herein described, and as disclosed in the following drawings, in which:

Fig. 1 is a top elevational view of a handle of the present invention.

Fig. 2 is a side view of a container to which the handle of Fig. 1 has been applied.

Fig. 3 is a top view of Fig. 2.

Fig. 4 is a bottom view of Fig. 2.

Fig. 5 is a top elevational view of a modified form of handle comprising a detail of the present invention.

Fig. 6 is a rear view of a container showing the handle of Fig. 5 associated therewith.

Fig. 7 is a side view of Fig. 6.

Fig. 8 is a top elevational view disclosing a modification of one end of the handle of Figs. 1 and 5.

Fig. 9 is a top elevational view of the end of a handle, disclosing another modified form.

With reference now to Fig. 1, it will be observed that the handle comprises, broadly speaking, a paired or spaced container engaging members 20 and 22 which are interconnected by means of a handle portion 24.

The handle structure is preferably, though not necessarily, fabricated from a single piece of sheet material, such as cardboard, plastic, sheet metal or the like, however, I found that excellent results are obtained when the handle is fabricated from cardboard.

With reference now to Fig. 1, it will be observed that container engaging member 20 has been provided with a cut-out portion 26 defined by a circumferential edge 28 and a diametric edge 30. A flap member 32 which is defined by thru cuts 34, 36 and 38, and which may be scored along line 40 is likewise provided in member 20.

At this point it should be borne in mind that the circumferential edge 28 and scored line 40 are spaced apart by a dimension substantially equal to the diameter of the side walls of a container 42 with which the handle is to be associated.

Container engaging member 22 is provided with a circumferentially disposed cut 44, being scored adjacent the handle portion as at 46 for providing a flap member 48, which is hingedly connected to handle portion 24 along scored line 46.

Those portions of the end members 20 and 22 disposed within edges 28 and line 40 and within cut line 44 respectively, may be considered part of the body of said members whereas the outer portions 80 and 82 may be considered as rim portions.

Can 42 comprises a top 50, a bottom 52, an upper bead 54, and a lower bead 56, said beads, as is customary, being of a diameter somewhat greater than the mean diameter of the side walls of the container.

The handle may be quickly secured to container 42 by folding flap 48 downwardly or rearwardly toward handle portion 24 while outer rim or perimeter 80 is introduced downwardly over upper bead 54 of the container whereby opening 58 will snugly and circumferentially engage the side walls of the container. The other end member 20 may now be associated with the bottom of the container by merely forcing flap 32 upwardly about scored line 40 as lower bead 56 is brought into engagement with flap 32. The forward end 60 of rim 82 may then be lifted upwardly for positioning the circumferential cut 28 above bead 56, as disclosed in Fig. 2, thereby positively locking the handle member relative to the container.

The resultant handle is quite rigid and imparts confidence in the user, and when the container and its associated handle are placed upon a supporting surface, as disclosed in Fig. 2, the hand receptive portion 62 will retain the shape illustrated, thereby enabling the user of the device to again quickly grasp the handle for the purpose of drinking the contents of the container.

It is to be understood that a suitable opening will be provided in top 50 of the container thru which the contents may be poured or drunk.

With particular reference to Fig. 2, it will be observed that flap members 32 and 48 extend along substantially the entire length of the container between members 20 and 22, thereby effectively providing a shield for precluding contact of the hand of the user with the side walls of the container.

The primary distinction between the structure disclosed in Fig. 5 and with the structure disclosed in Fig. 1 is that the entire area defined by the circumferential cut 44 is used to provide an enlarged flap or shield member 64. However, it is to be understood that flap or shield 64 functions in the same manner as flap 48 of Fig. 1.

Another distinction between the structure of Figs. 1 and 5 is that in Fig. 5 the circumferential cut or edge 28 comprises the forward edge of a flap member 66 which is hingedly secured to end member 20 along scored line 68. Preferably, though not necessarily, scored line 68 comprises a diameter of circumferential edge 28.

When the handle of Fig. 5 is associated with a container, it will be observed that flap 66, note Fig. 7, underlies the bottom edge of the container in such a manner as to provide an efficient coaster for spacing the bottom of the container from a supporting surface. In other respects, the function of the structures of Figs. 1 and 5 are identical.

In Fig. 8 is illustrated a modified form of end member 20 wherein a plurality of flap-like members 70, 72 and 74 are provided, each flap being defined by a circumferential cut 76 and a pair of radial end cuts 78. Flaps 72 and 74 are adapted to be raised upwardly for providing abutment members for limiting and locating the position of the container bottom relative to end member 20 and hand portion 24. After the container has been positioned against flaps 72 and 74, flap member 70 may be lifted for engaging the forward portion of bottom bead 56 of the container. In this manner the bottom of the container will be fixed against accidental or unintentional movement relative to end member 20 and its associated handle portion 24.

The structure disclosed in Fig. 9 differs from that disclosed in Fig. 8 in that flap 70 has been replaced by a circumferential thru cut 28 and flaps 72 and 74 have been replaced by a circumferential cut 90, which is located adjacent handle portion 24. It will be understood that the circumferential cuts 28 and 90 are spaced apart by a dimension such that cut 90 may be lifted over the rear, handle adjacent, portion of lower bead 56 of a container for disposing edge 90 in contact with the side wall of the container above the bottom bead thereof. Likewise circumferential cut 28 is adapted to permit portion 60 of the end member to be lifted upwardly for disposing edge 28 in contact with the side wall of the container above bead 56. It will be understood that those portions of the device disclosed in Figs. 8 and 9, which are located between the container engaging flaps 70, 72, and 74; and circumferential cuts 28 and 90 will comprise a bottom to the handle structure which will serve the purpose of a coaster, thereby positively precluding the passage of moisture from the side walls and bottom of the container onto a supporting surface.

It should be understood that certain changes in the structural details of the device may be made, within the scope of the appended claims, without departing from the spirit of the invention.

What is claimed is:

1. A can handle fabricated from a single piece of sheet material and comprising a pair of can engaging members interconnected by a handle portion, one of said members constructed and arranged to completely encircle the body of a can, said other member provided with spaced cuts which define a central portion adapted to extend under and span the lower end of the can, and a rim portion adapted to engage diametric portions of the side walls adjacent the lower end of the can.

2. A can handle fabricated from a single piece of sheet material formed to provide a pair of spaced can engaging members interconnected by a handle portion, one of said can engaging members including a continuous opening dimensioned to snugly receive, completely encircle and circumferentially engage the sidewall of a can, the second can engaging member dimensioned to overhangingly engage in abutting relationship the closed lower end of said can, and means provided in said second member for securing it in contact with and against accidental or unintentional movement relative to the lower end of said can said means comprising abutments struck from the second member to engage portions of the side walls of the can adjacent its lower end, said abutments dividing said second member into a portion which extends beneath and spans the can bottom and a portion which extends outwardly from the can walls.

3. A container handle fabricated from a single piece of sheet material formed to provide a pair of spaced container engaging members interconnected by a handle portion, one of said members including a continuous opening dimensioned to receive, completely encircle and loosely circumferentially engage the side walls of a container, the other member dimensioned to extend under and overhangingly engage the lower end of said container and including abutments struck from said second member and positioned to engage portions of the perimeter of the lower end of a container positioned upon said member for locking said container end thereto, and for precluding accidental or unintentional relative movement between said member and its associated container.

4. A container handle fabricated from a single piece of sheet material and comprising a pair of spaced container engaging members interconnected by a handle portion, one of said members including an opening dimensioned to receive and circumferentially engage the side walls of a container, the other member dimensioned to overhangingly engage an end of said container, said second member including a substantially semicircular opening located remote from said handle and dimensioned to receive and circumferentially engage a portion of said container wall adjacent an end thereof and an abutment element struck from said second member adjacent said handle and diametrically spaced from said semi-circular opening by a dimension substantially equal to the diameter of the container.

5. A container handle fabricated from a single piece of sheet material and comprising a pair of container engaging members interconnected by a handle portion, one of said members including an opening dimensioned to receive and circumferentially engage the side walls of a container, said first member including a flap defined by said opening and secured to said member adjacent the handle; the other member dimensioned to overhangingly engage in abutting relationship, an end of said container, means for securing said second member relative to an end of said container, said means comprising abutments struck from the second member to engage portions of the side walls of the container adjacent its lower end, said abutments dividing said second member into a central portion which extends beneath and spans the carrier bottom and a rim portion which projects outwardly from the container walls, said flap foldable downwardly from the plane of said first mentioned member to a position along and in abutment with the sidewall of the container for providing a barrier between the handle and said container.

6. A handle for containers having end beads of a diameter greater than the mean diameter of the side walls of the container, said handle fabricated from sheet material and comprising a pair of container engaging members interconnected by a handle portion, one of said members including a continuous opening dimensioned to pass over an end bead of a container, completely encircle and circumferentially engage the side walls thereof, the other member dimensioned to overhangingly engage the lower end of said container and including circumferentially disposed slits for providing flaps dimensioned to pass over the lower end bead of the container and lockingly engage the container side walls adjacent thereto for precluding accidental or unintentional relative movement between said member and its associated container.

7. A container handle fabricated from a single piece of sheet material and comprising a pair of spaced container engaging members interconnected by a handle portion, one of said members including an opening dimensioned to receive and circumferentially engage the side walls of a container, the other member dimensioned to overhangingly engage an end of said container, said member including an arcuate slit located remote from said handle and dimensioned to receive and circumferentially engage a portion of said container wall adjacent an end thereof and a second arcuate slit located adjacent said handle and dimensioned to receive and circumferentially engage a portion of said container wall adjacent an end thereof, said circular slit located on a circle the diameter of which is of a dimension substantially equal to the diameter of the container.

8. A container handle fabricated from sheet material and comprising a pair of spaced container engaging members interconnected by a handle portion, one of said members including a flap formed therein and connected thereto adjacent the handle portion, said flap foldable downwardly from the plane of said member to provide an opening in said member to receive and circumferentially engage the side walls of a container, said flap constructed and arranged to extend downwardly from said member along and in abutment with the side wall of said container for providing a shield between said handle portion and the container, the other member dimensioned to overhangingly engage, in abutting relationship the bottom end of said container for spacing the bottom of the container from a supporting surface, and means struck from said last mentioned member constructed and arranged to lockingly engage the end-adjacent portion of the container for locking it relative to and in endwise abutting relationship with said member.

9. A one-piece disposable handle for containers such as cans, and the like, said handle fabricated from a single piece of fibrous sheet material formed to provide a pair of spaced container engaging members interconnected by a handle portion, one of said members having a continuous opening dimensioned to loosely receive and completely encircle the outer wall of a container adjacent the upper end thereof, the other member having container engaging elements struck therefrom for dividing it into a portion which extends beneath and spans the lower end of the container and a portion which projects outwardly beyond the outer walls of said container, said elements arranged to engage portions of the perimeter end of the container for securing it in abutting contact portions of said member.

10. A container handle fabricated from a single piece of sheet material formed to provide a pair of spaced container engaging members interconnected by a handle portion, one of said members having a continuous opening dimensioned to receive and encircle the outer wall of a container adjacent the upper end thereof, said other member including a rim portion and a central portion constructed and arranged to abut the lower end of said container, said central portion set apart from said rim portion by cuts provided in said member which define abutments movable out of the mean plane of the second member to engage portions of the perimeter of the outer wall of a container, positioned over said central portion adjacent its lower end for disposing said rim portion outwardly beyond the outer wall of the container for positive attachment thereto and in supporting relationship therewith.

11. A container handle fabricated from sheet material and comprising a pair of spaced container engaging members interconnected by a handle portion, one of said members including a flap formed therein and connected thereto adjacent the handle portion, said flap foldable downwardly from the plane of said member to provide a continuous opening in said member to receive and circumferentially engage the side walls of a container, said flap constructed and arranged to extend downwardly from said member along and in abutment with the side wall of said container for providing a shield between said handle portion and the container, the other member constructed and arranged to abut the entire area of the bottom end of said container, and means struck from said last mentioned member for locking it in supporting relationship relative to the bottom of said container.

12. A handle for containers of that class characterized by end beads having a diameter greater than the mean diameter of the body portion between said beads, said handle comprising a pair of container engaging members interconnected by a handle portion, one of said members including an opening dimensioned to pass over the upper bead of a container and circumferentially engage the body portion below said bead, the second member including a central portion to underlie and a rim portion to overlap the lower end of the container, abutments struck from said second member defining said central and rim portions, said abutments engageable with the upper edge of the lower bead of the container for securing it to said member and for enabling the container to be lifted by said handle portion.

13. An inexpensive, disposable handle for containers of the class characterized by end beads of a diameter greater than the diameter of the body portion between said beads, said handle fabricated from fibrous sheet material maintained in a flat condition until ready for attachment to a container, said handle comprising a pair of container engaging members interconnected by a hand grip portion, said members when attached to a container being disposed in substantially spaced parallelism and at substantially right angles with the mean axis of said hand grip portion, one of said members including an opening dimensioned to pass over the upper bead of a container and circumferentially engage the body portion below said upper bead, the second member including a central portion constructed and arranged to abut and spanningly engage the lower end of the container, and a discontinuous rim portion to overlappingly engage portions of the lower bead of the container for securing said second member relative to the container bottom, said second member constructed and arranged to support the weight of said container incident to the application of a lifting face to said hand grip member.

14. A container handle fabricated from sheet material and comprising a pair of spaced container engaging members interconnected by a handle portion, one of said members including a flap formed therein and connected thereto adjacent the handle portion, said flap foldable downwardly from the plane of said member to provide an opening in said member to receive and circumferentially engage the side walls of a container, said flap constructed and arranged to extend downwardly from said member along and in abutment with the side wall of said container for providing a shield between said handle portion and the container, the second member dimensioned to circumferentially project beyond the bottom end of said container including spaced means defining a central area substantially coextensive with the area of the bottom of the container, said means shiftable from the mean plane of said central area for engaging portions of the container immediately adjacent its bottom end for locking said second member to the bottom of the container.

15. A container handle fabricated from sheet material and comprising a pair of spaced container engaging members interconnected by a handle portion, one of said members including a flap formed therein and connected thereto adjacent the handle portion, said flap foldable downwardly from the plane of said member to provide an opening in said member to receive and circumferentially engage the side walls of a container, said flap constructed and arranged to extend downwardly from said member along and in abutment with the side wall of said container for providing a shield between said handle portion and the container, the second member dimensioned to circumferentially project beyond the bottom end of said container including spaced means defining a central area substantially coextensive with the area of the bottom of the container, said means shiftable from the mean plane of said central area for engaging portions of the container immediately adjacent its bottom end for locking said second member to the bottom of the container, said second member providing a barrier between the bottom of the container and a supporting surface upon which it is placed.

16. A can holder fabricated from a single piece of sheet material formed to provide a pair of spaced can engaging members interconnected by a handle portion, one of said can engaging members including a continuous opening dimensioned to receive and circumferentially engage the side walls of the body portion of a can continuous adjacent its upper end, the second member including a central portion and a rim portion partly severed therefrom, said central portion dimensioned to receive and engage the lower end of a can, said rim portion dimensioned to engage portions of the outer side walls of the can adjacent its lower end for locking the composite second member relative to the lower end of the can.

JOHN WARREN KINNEY, Jr.

REFERENCES CITED

The following references are of record in the file of this patent:

UNITED STATES PATENTS

| Number | Name | Date |
| --- | --- | --- |
| 902,236 | Kintz | Oct. 27, 1908 |
| 1,166,209 | Hoffman | Dec. 28, 1915 |
| 1,464,789 | Ward | Aug. 14, 1923 |
| 1,486,967 | Kaufman | Mar. 18, 1924 |
| 1,688,165 | Tehel | Oct. 16, 1928 |
| 2,070,367 | Mackilbank | Feb. 9, 1937 |
| 2,070,414 | Snell | Feb. 9, 1937 |